March 5, 1957 KAIJI NEGORO 2,783,920
METERING VALVE
Filed Nov. 9, 1953
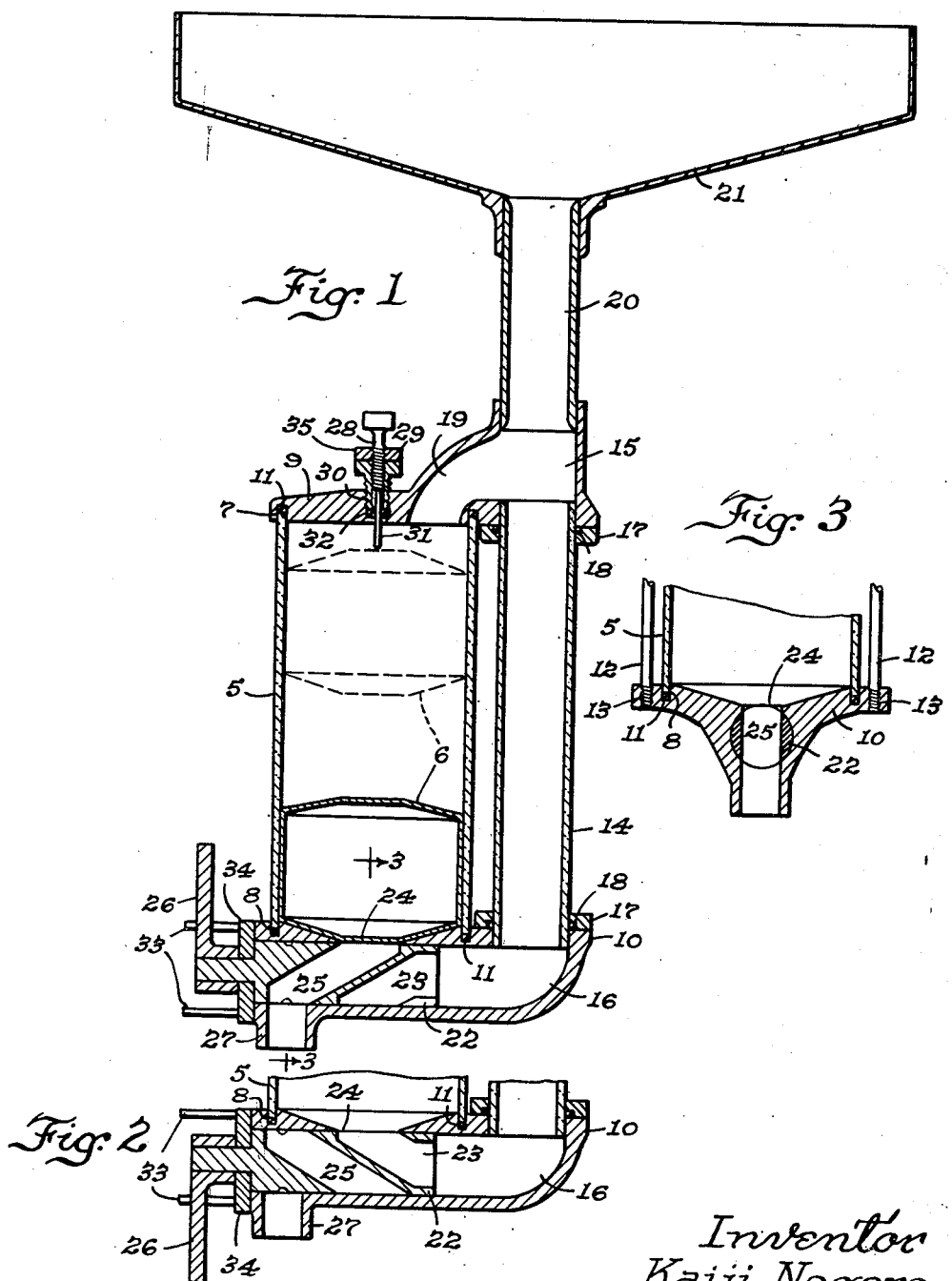
Inventor
Kaiji Negoro United States Patent Office 2,783,920
Patented Mar. 5, 1957

2,783,920

METERING VALVE

Kaiji Negoro, Rockford, Ill.

Application November 9, 1953, Serial No. 390,865

3 Claims. (Cl. 222—250)

This invention relates to a metering valve for dispensing measured amounts of liquids.

The principal object of my invention is to provide a metering valve, which, though easily adjustable to vary the amount of the charge per operation, is not subject to leakage or entrapment of air, and consequently discharges the same predetermined amount of liquid in each operation.

The metering valve of my invention operates on the principle of a one-stroke motor, and includes a featherweight piston working up and down in a measuring cylinder and arranged to float upwardly to a limit position predetermined by the setting of an adjustable screw when the upper and lower ends of the cylinder are placed in communication with the source of liquid supply under a given pressure head. Thus, the piston is subject to nearly balanced pressure in the measuring position and, hence, closer accuracy is assured due to the absence of any likelihood of leakage. The lower end of the cylinder has a two-way control valve cooperating therewith and arranged to cut off communication between the lower end of the cylinder and said supply and open communication for the cylinder with a discharge spout, so that the charge of liquid in the measuring cylinder may be expelled under hydraulic pressure from the source of liquid supply active on the piston. Increase or decrease in the volume of the charge is permitted by the operation one way or the other of the single simple screw adjustment limiting upward travel of the piston.

The invention is illustrated in the accompanying drawing, in which—

Fig. 1 is a vertical section through a metering valve made in accordance with my invention, the piston being shown in full lines in the lower limit position and in dotted lines in the upper limit position;

Fig. 2 is a view corresponding to the lower portion of Fig. 1 showing the control valve turned to the other operative position for refilling the cylinder, and Fig. 3 is a sectional detail on the line 3—3 of Fig. 1.

The same reference numerals are applied to corresponding parts throughout these views.

Referring to the drawing, the reference numeral 5 designates the measuring cylinder and 6 a piston of lightweight construction in relation to the liquid being dispensed in measured amounts, operable up and down in the cylinder. The cylinder 5, the tubular body of which may be of glass or any other suitable material, has the ends of the tubular body entered in annular grooves 7 and 8 provided in the top and bottom members 9 and 10, compressing gasket rings 11 placed in the grooves to form liquid-tight joints. Rods 12 disposed on diametrically opposite sides of the cylinder 5, as indicated in Fig. 3, are threaded at their opposite ends in holes 13 provided therefor in the top and bottom members 9 and 10 and serve to draw these top and bottom members together sufficiently to prevent leakage. A tube 14 disposed in parallel relation to the cylinder 5 affords unrestricted communication between chambers 15 and 16 in the top and bottom members 9 and 10, respectively, suitable stuffing boxes 17 having O-rings 18 therein making the joints at the opposite ends of the tube 14 leakproof. The chamber 15 has unrestricted communication with the upper end of the cylinder 5 through the passage 19 and there is a tube 20 extending upwardly from the chamber 15 to the hopper 21 containing a suitable supply of the liquid to be dispensed in measured amounts. The chamber 16 is also adapted to have unrestricted communication with the lower end of the cylinder 5 when the two-way rotary valve 22 is in the position shown in Fig. 2, in which the diagonally extending passage 23 therein communicates with the port 24 provided in the member 10 opening into the lower end of the cylinder 5. Another diagonally extending passage 25 is provided in the valve 22 in parallel relation to passage 23, and, when the valve 22 is turned by means of the handle 26 through 180° from the position shown in Fig. 2 to that shown in Fig. 1, the lower end of the cylinder 5 is placed in unrestricted communication with a discharge spout 27.

A screw 28 which is threaded in a bushing 29 that in turn is threaded in a hole 30 provided in the upper member 9 has a reduced stem 31 on the end thereof projecting downwardly in the upper end of the cylinder 5 to serve as a stop to limit upward travel of the piston 6, as indicated in dotted lines in Fig. 1. Compressible packing material is inserted in the hole 30 to be compressed by the tightening of the bushing 29 and prevents leakage along the stem 31.

In operation, the operator turns the valve 22 by means of handle 26 through 180° from the one operative position shown in Fig. 1 to the other operative position shown in Fig. 2, suitable means, such as stop pins 33, being provided on the cap 34 to define these limit positions. When the valve 22 is in the position shown in Fig. 2 liquid flows through passage 23 into the lower end of the cylinder 5 as the piston 6 floats upwardly to the upper limit position indicated in dotted lines in Fig. 1, engaging the stem 31. There is then an accurately predetermined amount of liquid in the cylinder 5 below the piston 6 and, because the piston 6 is under nearly equalized pressure on top and bottom, there will be no leakage to disturb the accuracy of measurement no matter how long an interval there may be between charging and discharging. The small pressure differential responsible for upward movement of the piston 6 is due to the difference in gravity pressure head on the upper and lower faces of the piston 6 and is enough to overcome the weight of the piston and the small friction between the piston and the wall of the cylinder, thereby causing the piston to rise when the valve 22 is in the position shown in Fig. 2. When the valve 22 is turned to the other position shown in Fig. 1 the piston 6 moves downwardly under pressure of the head of liquid in the hopper 21, and expels the measured amount of liquid from the cylinder through the spout 27 into a receptacle placed therebeneath. Then the valve 22 is reversed again and the same procedure described is repeated again and again. Notice that there is no place in this valve structure where air is apt to be trapped and interfere with the accuracy of the charge. The same amount of liquid is discharged in each operation but the amount may be changed by adjusting the screw 28 to increase or decrease the volume of liquid per operation. A lock nut 35 may be provided on the screw 28 to lock it in adjusted position.

It is believed the foregoing description conveys a good understanding of the objects and advantages of my invention. The appended claims have been drawn to cover all legitimate modifications and adaptations.

I claim:

1. In a liquid metering device of the character described, an upright measuring cylinder, a hopper at a higher elevation than said cylinder containing liquid to be dispensed in measured volume, means providing unrestricted uncontrolled communication for gravity flow at one pressure between said hopper and the top of said cylinder, another means for providing unrestricted controlled communication for gravity flow at a slightly greater pressure between said hopper and the bottom of said cylinder, the latter means including control valve means which in one position opens communication for the bottom of said cylinder with said hopper and in another position with a discharge spout, and a gravitating piston of light weight in relation to an equivalent volume of the liquid to be dispensed slidable up and down with a free working fit in said cylinder adapted when both ends of said cylinder are in communication with the hopper to enclose below it in said cylinder a predetermined volume charge of liquid for subsequent discharge.

2. In a liquid metering device of the character described, an upright measuring cylinder, liquid supply means in unrestricted uncontrolled communication continuously with the top of said cylinder for flow of liquid into the top of said cylinder at one pressure, another liquid supply means in unrestricted controlled communication with the bottom of said cylinder for flow of liquid at a slightly greater pressure into the bottom of said cylinder, the latter means including control valve means which in one position opens communication for the bottom of said cylinder with said latter means and in another position with a discharge spout, and a gravity piston of light weight in relation to an equivalent volume of the liquid to be dispensed slidable up and down with a free working fit in said cylinder adapted when both ends of said cylinder are in communication with the liquid supply means to enclose below it in said cylinder a predetermined volume charge of liquid for subsequent discharge.

3. As a mechanical movement, a one-stroke motor device consisting of an upright cylinder having a combined gravitating float and piston element operable up and down in said cylinder, liquid supply means in unrestricted uncontrolled communication continuously with the top of said cylinder for flow of liquid into the top of said cylinder at one pressure, another liquid supply means adapted to deliver liquid to the lower end of said cylinder at a slightly greater pressure and to be placed in unrestricted communication with the lower end of said cylinder, and a two-position valve means which in one position establishes unrestricted communication between said last mentioned means and the lower end of said cylinder and which in the other position cuts off communication with said last mentioned means and establishes communication between the lower end of said cylinder and a discharge port.

References Cited in the file of this patent

UNITED STATES PATENTS

| | | |
|---|---|---|
| 1,173,294 | Maloney | Feb. 29, 1916 |
| 1,454,765 | Patterson et al. | May 8, 1923 |
| 1,590,278 | Bell | June 29, 1926 |
| 2,565,045 | Ray | Aug. 21, 1951 |
| 2,588,057 | Thomas | Mar. 4, 1952 |
| 2,652,953 | Gray | Sept. 22, 1953 |